(12) United States Patent
Franzaroli

(10) Patent No.: US 7,014,032 B2
(45) Date of Patent: Mar. 21, 2006

(54) METHOD AND DEVICE FOR ALIGNING ARTICLES AND MEANS FOR DETECTING THE POSITION OF THE ARTICLES

(75) Inventor: Massimo Franzaroli, Castel Maggiore (IT)

(73) Assignee: Pulsar S.r.l., Castela Maggiore (IT)

( * ) Notice: Subject to any disclaimer, the term of this patent is extended or adjusted under 35 U.S.C. 154(b) by 0 days.

(21) Appl. No.: 10/483,659

(22) PCT Filed: Jul. 8, 2002

(86) PCT No.: PCT/IB02/02687

§ 371 (c)(1),
(2), (4) Date: Jan. 12, 2004

(87) PCT Pub. No.: WO03/011723

PCT Pub. Date: Feb. 13, 2003

(65) Prior Publication Data

US 2004/0168887 A1  Sep. 2, 2004

(30) Foreign Application Priority Data

Jul. 11, 2001 (IT) .......................... BO2001A0435
Oct. 10, 2001 (IT) .......................... BO2001A0622

(51) Int. Cl.
  *B65G 47/244* (2006.01)
  *B65G 47/24* (2006.01)
  *B65G 47/252* (2006.01)

(52) U.S. Cl. .................... 198/399; 198/376; 198/382; 198/383; 198/395; 198/398; 414/759

(58) Field of Classification Search ............... 198/388, 198/395, 383, 399, 376, 379, 411, 415, 389, 198/382, 398, 385, 401, 403, 404, 416; 414/757, 414/758, 759

See application file for complete search history.

(56) References Cited

U.S. PATENT DOCUMENTS

| | | | |
|---|---|---|---|
| 3,710,922 A | | 1/1973 | Armstrong et al. |
| 3,722,657 A | * | 3/1973 | Kienle et al. ............... 198/394 |
| 3,954,171 A | | 5/1976 | Chick et al. |
| 3,967,724 A | | 7/1976 | Allen et al. |
| 4,653,628 A | * | 3/1987 | Claypool et al. ........... 198/395 |
| 4,782,939 A | | 11/1988 | Fields |
| 4,784,493 A | * | 11/1988 | Turcheck et al. ........... 356/394 |
| 4,819,784 A | * | 4/1989 | Sticht ......................... 198/395 |
| 4,934,510 A | * | 6/1990 | Lutgendorf .............. 198/461.3 |
| 4,974,718 A | * | 12/1990 | Raasch et al. ............. 198/406 |
| 5,074,400 A | * | 12/1991 | Focke et al. ................ 198/415 |
| 5,301,793 A | * | 4/1994 | Kovacs ....................... 198/415 |
| 5,358,092 A | * | 10/1994 | Cinotti ....................... 198/415 |
| 5,370,216 A | * | 12/1994 | Tsuruyama et al. ......... 198/395 |
| 5,762,175 A | * | 6/1998 | Focke et al. ............. 198/461.2 |
| 5,823,317 A | * | 10/1998 | Bankuty et al. ............ 198/395 |
| 5,873,450 A | * | 2/1999 | Rusch et al. ................ 198/415 |
| 5,924,546 A | * | 7/1999 | Funaya ....................... 198/395 |
| 6,374,984 B1 | * | 4/2002 | Nagler ....................... 198/382 |

FOREIGN PATENT DOCUMENTS

| | | |
|---|---|---|
| EP | 0 700 847 | 3/1996 |
| GB | 2 035 974 | 6/1980 |

* cited by examiner

Primary Examiner—Douglas Hess
(74) Attorney, Agent, or Firm—Young & Thompson

(57) ABSTRACT

A method and apparatus is disclosed for aligning rolls in a feed system. The rolls are spaced at regular intervals so as to enable incorrectly positioned rolls to be turned to the correct feed position, when necessary, while they are moving forward in a feed direction. The correct position of each roll is identified by detecting the longitudinal hole through the center of the roll.

21 Claims, 6 Drawing Sheets

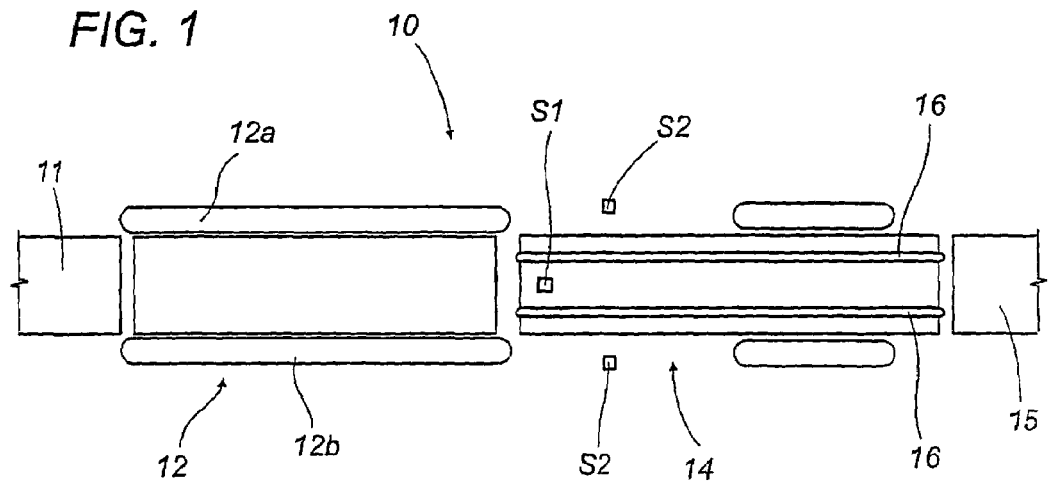
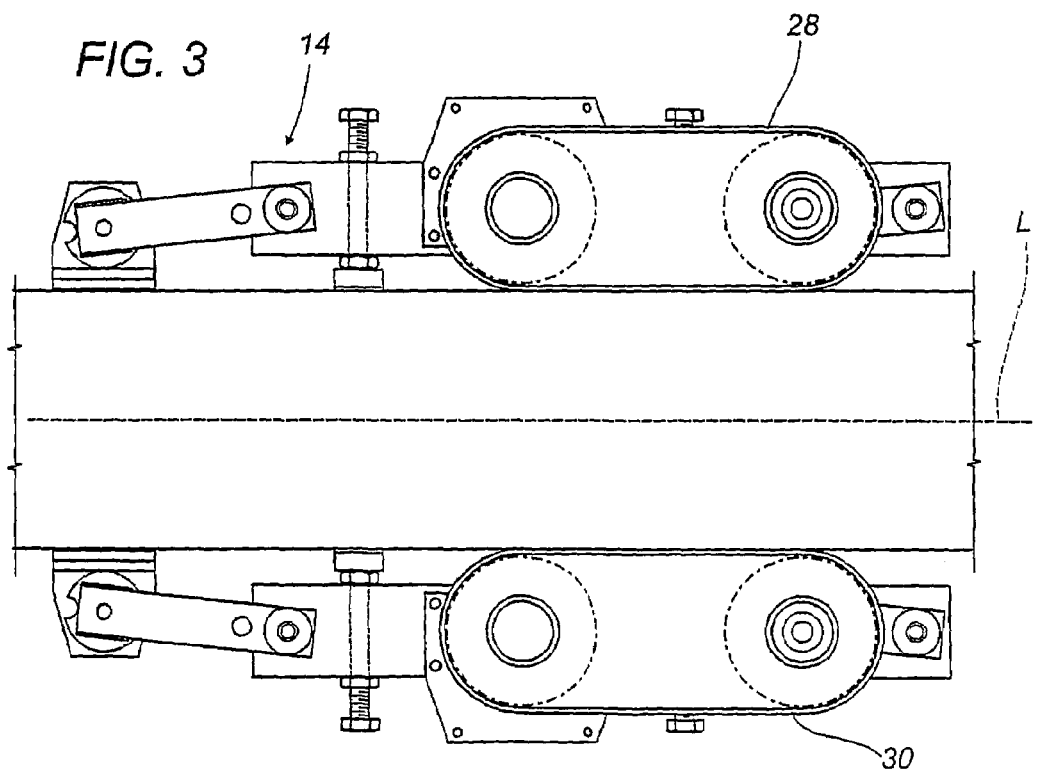

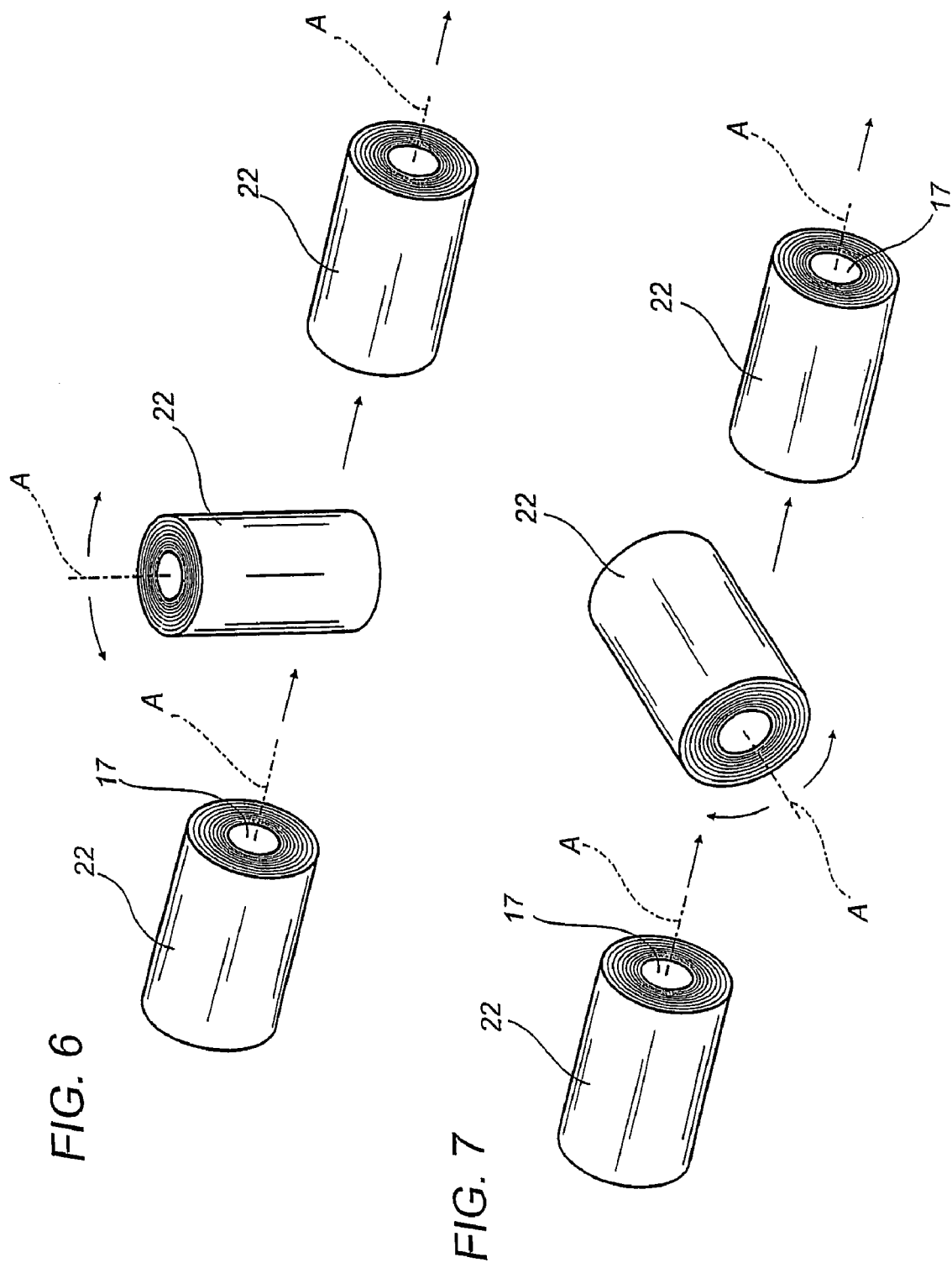

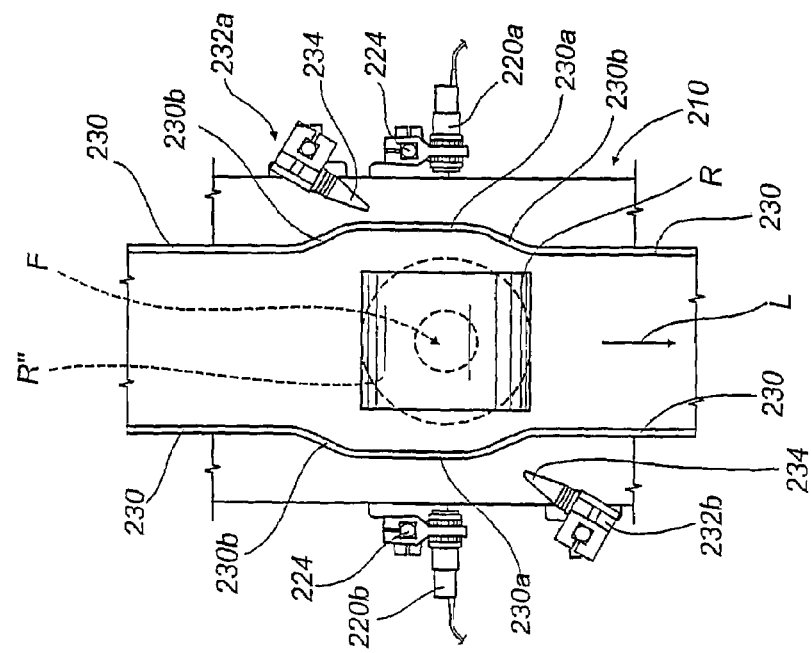
FIG. 10
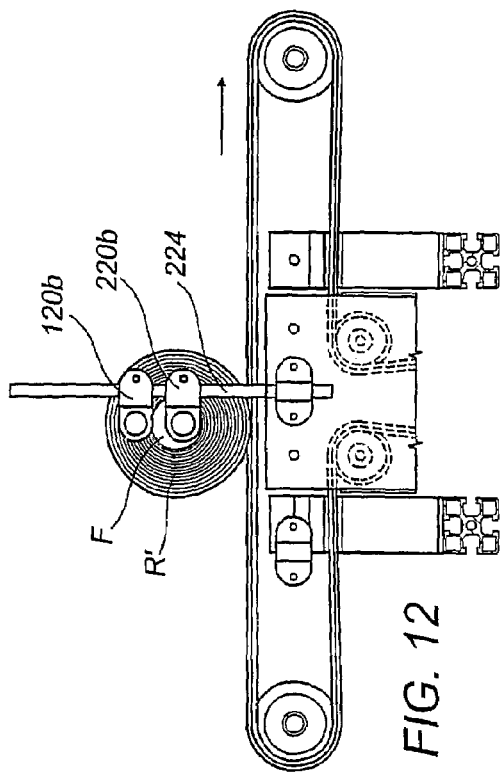
FIG. 11
FIG. 12

METHOD AND DEVICE FOR ALIGNING
ARTICLES AND MEANS FOR DETECTING
THE POSITION OF THE ARTICLES

TECHNICAL FIELD

The present invention addresses a method and device used to align articles, especially rolls, as they move along a feed line.

The aligning method and device according to the invention are used preferably, but not exclusively, on conveyor lines along which these articles are transported or in a machine which processes the rolls.

BACKGROUND ART

Machinery for the packaging of rolls, especially toilet paper rolls, has to deal with the problem of misaligned rolls.

The rolls are normally fed along the conveyor lines lengthways, with their longitudinal axes aligned in the direction of feed, that is to say, in the same direction as the conveyors themselves extend.

This arrangement allows the rolls to be correctly fed into the packaging machines that wrap them, usually with plastic film, in packs of various sizes.

A problem common to prior art machinery of this kind is that of rolls becoming misaligned or upturned as they move along the conveyors. Misalignment or upturning may be due to any of various reasons.

Existing packaging machines are therefore equipped with suitable sensors designed to detect the outside shape of the roll and to interact with a control system which accordingly "perceives" whether the roll is correctly positioned, that is to say, with its longitudinal axis aligned in the direction of feed, or whether it is moving along in an incorrect position. When the roll is misaligned, however, this roll detection system does not detect the actual position of the roll and simply provides a generic incorrect position signal.

Once the sensors have detected an incorrectly positioned roll, they issue a stop signal which brings the packaging machine and the production line to a halt, resulting in considerable down time and significant losses.

To overcome this drawback, personnel is especially employed to remove or re-align incorrectly positioned rolls before these rolls are detected by the sensors. The workers are placed at the packaging machine or in the proximity of the roll position sensors and instructed to take corrective action before the incorrect position signal is issued so as to prevent the machine from stopping and avoid the consequent stoppages in production.

In other terms, manual labour is required to remove incorrectly positioned rolls from the production line or to realign them by hand on the conveyor that feeds them into the packaging machine.

DISCLOSURE OF THE INVENTION

It is provided a method for aligning articles, in particular rolls, preferably rolls of paper and the like, such as toilet paper rolls, kitchen rolls, rolls of paper, plastic or aluminium foil for household use and the like, the method being characterised in that the position of each roll is detected as it feeds forward and, if the position does not match a predetermined feed position, action is taken to move the incorrectly positioned article or roll into the required feed position.

In this way, an automatic procedure is provided to reset the rolls in the correct feed position.

Thanks to the method according to the invention, the need for supervisory personnel to check and reset the rolls to the correct position is minimised.

According to another aspect of the aligning method provided by the invention, the action to reset the article or roll to the required feed position is taken while the article or roll is being fed forward.

Thus, no significant delays are produced along the roll feed line.

Advantageously and according to another aspect of the aligning method provided by the invention, the action to reset the article or roll to the required feed position consists in turning the article or roll.

According to yet another aspect, the articles or rolls are spaced so as to enable the step of turning the article or roll to be performed.

This procedure is advantageously implemented in cases where the articles or rolls are close together or not sufficiently spaced to enable an incorrectly positioned article or roll to be effectively turned.

According to yet another aspect of the present invention, the position of each article or roll is found by detecting the position of the longitudinal hole through the centre of the article or roll.

Thus, by a simple step of detecting the position of the hole through the centre of the article or roll, it is possible to identify the position of the article or roll itself. Suitable action can then be taken to correct the position where necessary.

According to another aspect of the invention, the article or roll is moved from a vertical position to a position where its longitudinal axis is positioned lengthways relative to the feed direction by turning the article or roll in a vertical longitudinal plane.

The article or roll may also be moved from a transverse position relative to the feed direction to a longitudinal position relative to the feed direction by tipping the article or roll in a horizontal plane.

It is also provided an advantageous device for aligning articles, in particular rolls, preferably rolls of paper and the like, such as toilet paper rolls, kitchen rolls, rolls of paper, plastic or aluminium foil for household use and the like, the device being characterised in that it comprises means for feeding the rolls, means for detecting the positions of the rolls as they feed forward and control means which, if the position of each article or roll does not match a predetermined feed position, activate corresponding means acting on the incorrectly positioned article or roll so as to move the article or roll into the required feed position.

According to another aspect of it, the invention provides a device for aligning rolls comprising means which act on each roll in such a way as to move the roll into the required feed position and which, to perform this step of realigning the roll, use at least one jet of fluid.

The use of a fluid under pressure makes it possible to act on misaligned rolls to return them to the correct feed position so as to achieve at least one of the advantageous effects listed below with reference to the third and fourth preferred embodiments of the invention.

According to another aspect of it, the invention also provides specific means for detecting the position of an article or roll in a conveyor line for these articles or rolls.

In an especially preferred embodiment, these detecting means are designed to detect the position of a hole passing through the article or roll.

The other claims relate to other advantageous aspects of the invention.

DESCRIPTION OF THE DRAWINGS

The technical characteristics and advantageous aspects of the invention are apparent from the detailed description which follows, with reference to the accompanying drawings which illustrate preferred embodiments of the invention provided merely by way of example without restricting the scope of the inventive concept, and in which:

FIG. 1 is a schematic representation of a first preferred embodiment of the device, according to the present invention, for returning rolls to the correct feed position;

FIG. 3 is a schematic top plan view of the first preferred embodiment of the device, according to the present invention, for returning rolls to the correct feed position;

FIG. 6 is a schematic representation of a situation where a roll, forming part of a plurality of rolls moving forward in the feed direction, is positioned vertically in an incorrect manner;

FIG. 7 is a schematic representation of a situation where a roll, forming part of a plurality of rolls moving forward in the feed direction, is positioned transversely in an incorrect manner;

FIG. 10 is a schematic top view of the third preferred embodiment of the device according to the present invention;

FIG. 11 is a schematic side view of a fourth preferred embodiment of the device according to the present invention;

FIG. 12 is a schematic cross section of the fourth preferred embodiment of the device according to the present invention.

DESCRIPTION OF THE PREFERRED EMBODIMENTS OF THE INVENTION

Figure 2:
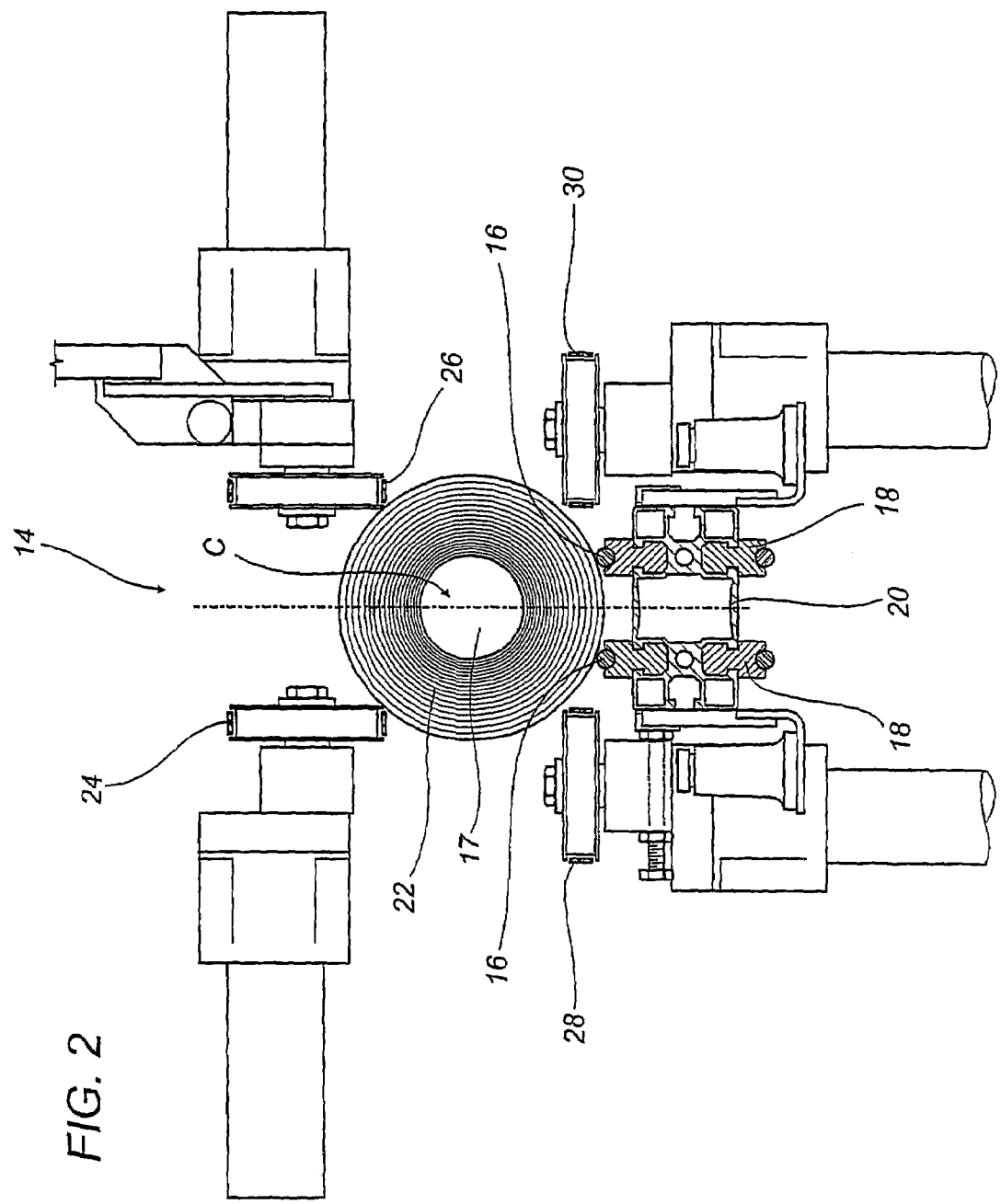
FIG. 2 is a schematic cross section of the first preferred embodiment of the device, according to the present invention, for returning rolls to the correct feed position.

FIG. 1 illustrates a preferred embodiment 10 of an alignment device used to return rolls to the correct feed position as they travel along a line, preferably the feed line of a packaging machine, between a conveying unit 11 upstream and conveying unit 15 downstream. The latter may be a conveyor 15 that feeds the rolls into a machine that wraps them in packs containing a predetermined number of rolls.

The device for returning misaligned rolls to the correct feed position according to the invention comprises a first unit 12 which spaces the rolls from each other and which consists preferably of a conveyor belt travelling faster than the upstream conveyor 11 in such a way as to position the rolls at predetermined regular intervals from each other.

This conveyor belt 12 might, for example, consist of an endless conveyor belt on which the rolls are fed forward. The unit 12 may, however, be made in any suitable manner.

Alternatively, as illustrated in FIG. 1, the first roll spacing unit might also consist of a pair of lateral belts 12a, 12b which contact the lateral surfaces of the rolls in such a way as to feed them forward lengthways.

In FIG. 1, the numeral 14 denotes a second unit of the roll aligning device according to the invention, this second unit being designed to detect the position of the rolls and to perform the aforementioned step of returning misaligned rolls to the correct feed position.

Preferably, in the unit 14, the misaligned rolls are returned to the correct feed position by turning them.

The repositioning unit 14, as illustrated better in FIGS. 2 and 3, showing a first preferred embodiment of it, comprises a pair of endless belts, preferably with circular cross section, labelled 16, 16, fitted to corresponding guides 18, 18 extending along a longitudinal path and mounted on a suitably shaped metal bar 20 of the mounting frame.

The belts 16, 16 feed the rolls towards the downstream conveyor unit 15 at a predetermined speed.

The belts 16, 16 consist of thin strips or endless elements which barely impinge on the bottoms of the rolls at positions which (in a cross sectional plane) can be considered substantially as points, providing a surface that supports the rolls without hindering the turning operation, when necessary, as described in more detail below.

As clearly shown in FIG. 2, when the roll 22 is in the correct position as it travels downstream, the belts 16, 16 contact it at two points located at equal angular intervals symmetrically about the vertical line through the centre of the roll.

As shown in FIG. 1, upstream of the means for returning the roll to the correct position, there is a sensor, labelled S1, designed to detect the roll if it is in the vertical position.

The sensor S1 preferably comprises an optical sensor or photocell (not illustrated in the drawings) having one part located above the belts 16, 16 at a position above the highest point of the roll as it feeds forward. This upper photocell portion emits an optical signal directed downwards towards a second part S1 of the photocell or optical sensor located at a position below the roll conveyor.

When a roll is transported by the belts 16, 16 with its axis positioned along the vertical—that is to say, with the cylindrical hole 17 through the centre of it positioned vertically (as shown in FIG. 6)—the optical signal emitted by the sensor S1 passes through the hole 17, thus indicating that the roll is incorrectly positioned.

This signal is used, as described in more detail below, to drive means for returning the roll to the correct position with its longitudinal axis positioned along the horizontal in the conveying direction, as shown in FIG. 6.

As illustrated in FIG. 1, the unit 14 further comprises sensor means S2 designed to detect the roll when its longitudinal axis "A" (or the central hole) is positioned horizontally transversely to the longitudinal direction of roll feed in the unit 14, as shown in FIG. 7.

The sensor means S2 consists of a suitable optical sensor or photocell similar to the one described above, but in this case positioned at the height of the hole 17 through the centre of the roll.

Therefore, if the roll is positioned with its longitudinal axis transverse to the feed direction (as shown in FIG. 7), the signal emitted by the sensor S2 passes through the hole in the roll and the sensor issues a signal that is used, as described in more detail below, to drive means for returning the roll to the correct longitudinal position.

As illustrated in FIG. 2, when the sensor S1 detects the presence of a roll positioned with its longitudinal axis along the vertical (as shown in FIG. 6), it activates a pair of belts 24, 26 which travel at a speed that is higher or lower than the speed at which the circular section belts 16, 16 are transferring the rolls 22 longitudinally.

The belts 24, 26 engage the upper lateral surface of the vertically positioned misaligned roll 22 so as to impart on this surface a speed that may be higher or lower than the speed imparted by the main conveyor belts 16, 16 on the lower lateral surface of the same roll 22. This causes the roll to tip or turn through 90°—forwards or backwards—in a vertical longitudinal plane.

Since the rolls have been suitably spaced in the upstream unit 12, this tipping operation is unhindered and may be carried out without difficulty. In particular, the conveyor line can continue operating since the rolls need not be stopped.

Instead, when the presence of a misaligned roll positioned with its longitudinal axis horizontal but transverse to the feed direction (as shown in FIG. 7) is detected by the sensor S2, the signal emitted by the sensor S2 activates a pair of lateral belts 28, 30 which, as shown especially in FIGS. 2 and 3, are positioned at the sides of the main feed belts 16, 16 and are designed to contact opposite sides of the misaligned roll.

Each of the lateral belts 28, 30 is driven at a different speed from the other in such a way that their combined action turns the transversely misaligned roll by 90° in a horizontal plane, returning it to the correct feed position with its longitudinal axis A positioned lengthways along the direction of feed.

If said sensor means S2 remain blacked out and do not detect the presence of any misaligned roll, none of the endless belts 24, 26 or 28, 30 for roll repositioning is activated and the rolls can be transferred downstream unhindered and without any tipping or turning action being imparted on them by the belts 24, 26, 28, 30.

The device according to the invention may also comprise means, which are not illustrated in detail in the drawings, for adjusting the positions of the tipping or turning belts 24, 26 and 28, 30 to suit the different sizes of the rolls that may be processed.

There may also be other means for adjusting the positions of the roll detector sensors S1 and S2 along the conveyor line.

Figure 4:
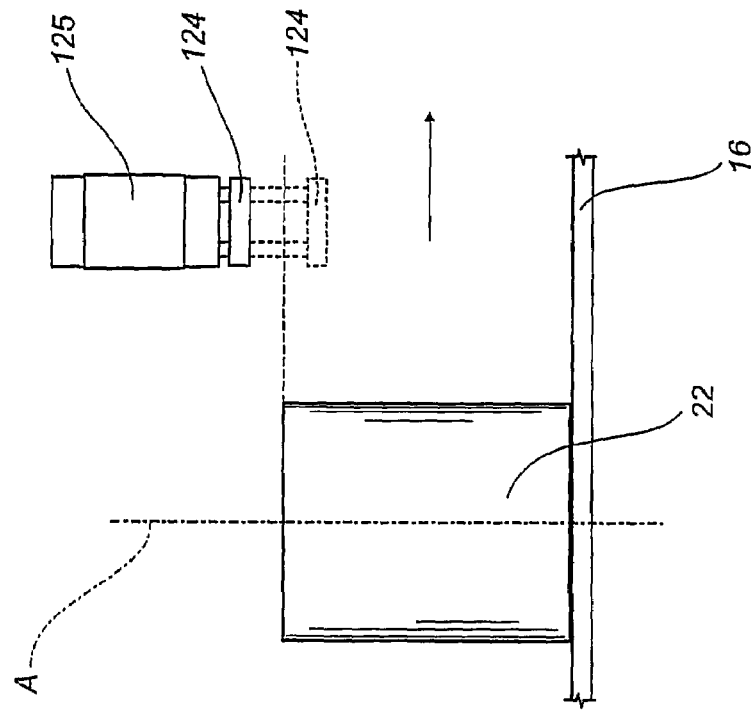
FIG. 4 is a schematic longitudinal view of a second preferred embodiment of the device, according to the present invention, for returning rolls to the correct feed position.

FIG. 4 illustrates a second preferred embodiment of the means for returning the roll to the longitudinal feed position starting from a condition where the roll is positioned with its axis A, or central hole, vertical. These means comprise a pusher or interference element, labelled 124 in FIG. 4, which can move between a retracted position (drawn with a continuous line) where it is clear of the roll being fed forward, to an extended position (drawn with a dashed line) where it comes into contact with the upper lateral surface of the roll 22.

When the sensor S1 detects the presence of a roll positioned vertically, the signal emitted by the sensor is applied to a pneumatic cylinder 125 which actuates the pusher 124 and which is located above the zone where the rolls pass.

The pneumatic actuator 125 thus moves the interference element 124 from a position (drawn with a continuous line) where it is clear of the roll being fed forward, to a position (drawn with a dashed line) where it comes into contact with the outer cylindrical surface of the roll at a point off-centre above the centre of gravity of the roll. This, combined with the action of the feed belts 16 on the bottom of the roll 22, causes the roll 22, whose axis A is positioned vertically, to be tipped over backwards in such a way that its axis A is positioned longitudinally in the direction of feed.

Figure 5:
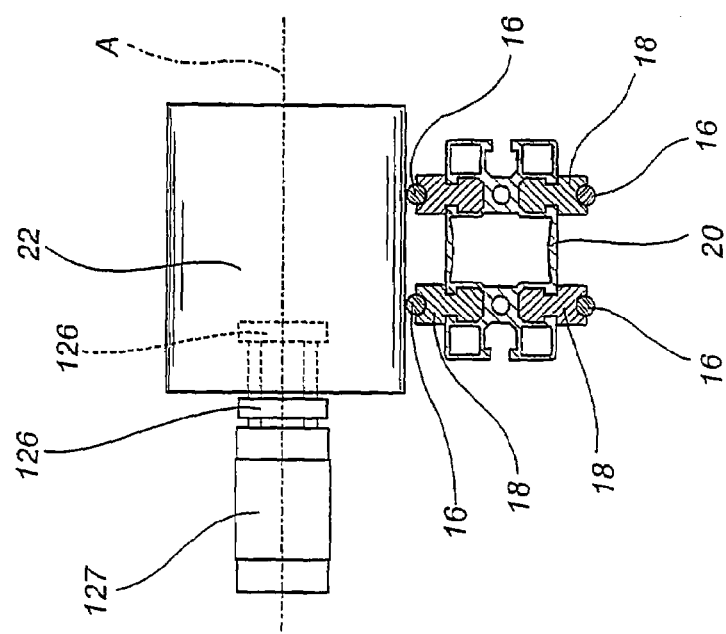
FIG. 5 is a schematic cross section showing in a second operating condition the second preferred embodiment of the device, according to the present invention, for returning rolls to the correct feed position.

As shown in FIG. 5, if a roll 22 is misaligned transversely, a second pusher or interference element 126, mounted on and driven by a corresponding pneumatic actuator 127, is moved from a withdrawn or retracted position to a forward or extended position where it interferes with the trajectory of the roll 22 in such a way as to turn it in a horizontal plane.

When the sensor activated is sensor S2, which detects the roll when the longitudinal axis A of the roll is positioned transversely, as shown in FIG. 5, the second pusher 126 is moved by the corresponding pneumatic cylinder or actuator 127, located at the sides of the zone where the rolls pass, from the retracted position (drawn with the continuous line) where it is clear of the roll, to the extended position (drawn with a dashed line) where it comes into contact with the outer cylindrical surface of the roll at a point off-centre relative to the longitudinal axis of symmetry of the feed belts 16, 16. This, combined with the action of the feed belts 16, 16 on the bottom of the roll 22, causes one end of the roll 22, whose axis A is positioned transversely, to be stopped by the pusher 126, in such a way as to turn the roll in a horizontal plane so that its axis A is positioned longitudinally in the direction of feed.

According to one aspect of the present invention, the device, in order to return the roll to the correct position, first of all spaces the rolls at regular intervals from each other. Then, if the rolls are positioned correctly, no action is taken, whereas, if the rolls are misaligned, they are returned to the correct feed position by the corresponding repositioning means.

To ensure that the aligning action is effective, the device might comprise first and second sensor means, mounted one after the other, to detect vertically misaligned rolls, and first and second sensor means, mounted one after the other, to detect transversely misaligned rolls.

Alternatively, instead of systematically spacing all the rolls on the feed line, the step of spacing the rolls might be applied only to those that are not in the correct position. For this purpose, it would be necessary to place the means for detecting roll position upstream of the spacing means and upstream of the repositioning means so that the spacing means are activated only for the rolls that have to be realigned according to the required feed position.

Roll spacing must, however, be such as to enable the tipping or turning means to correctly reposition the misaligned rolls.

Instead of the aforementioned photocells to detect the actual position of the rolls feeding forward, cameras designed to detect the shape of the roll feeding forward might also be used. Special image management software allows the position of each single roll to be traced and, in the event of a misaligned roll, indicates the type of misalignment. Where necessary, the management software activates the means used to return the misaligned rolls to the correct feed position.

The alignment device according to the present invention is controlled by an appropriate control unit (a PC or a PLC), which receives the signals from the sensor means (optical sensors or cameras) processes them and, if necessary, activates the actuating means (electric motors for driving the roll turning belts or pneumatic cylinders) used to return misaligned rolls to the correct feed position. The electronic control unit may consist of a central unit controlling the entire machine or system in which the present device is installed.

Figure 8:
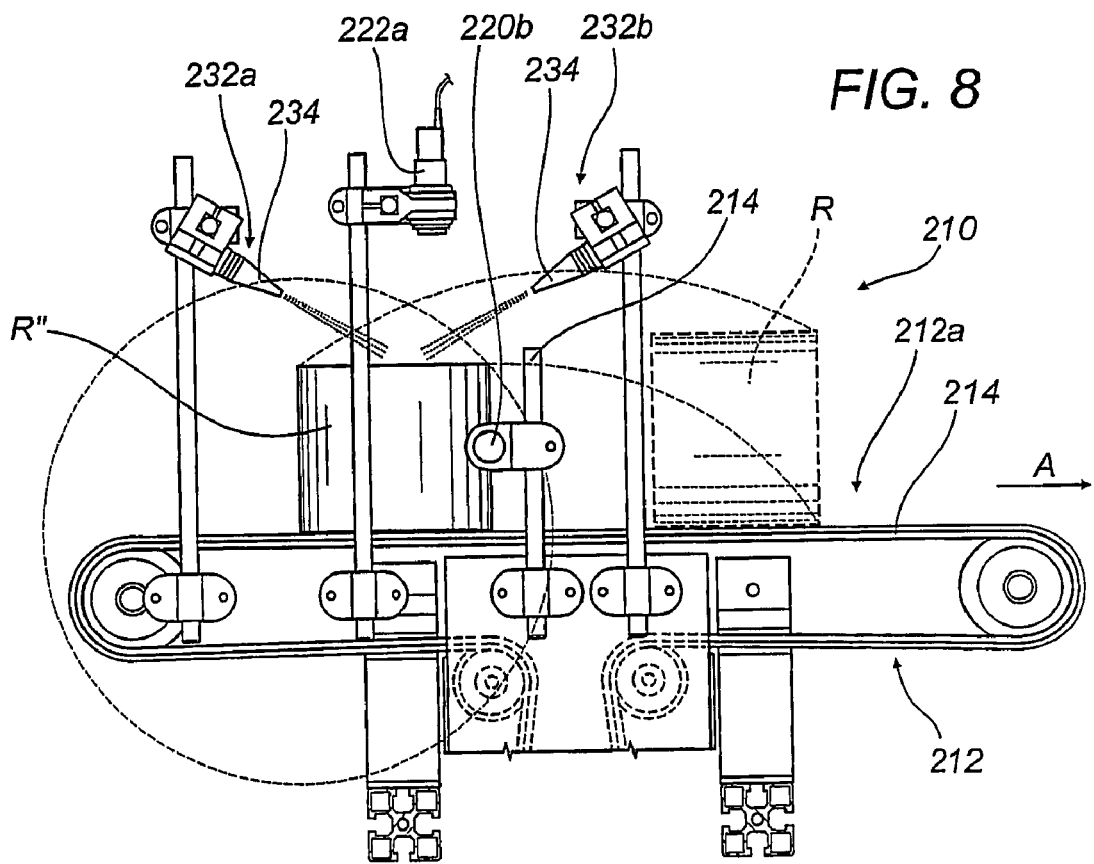
FIG. 8 is a schematic side view of a third preferred embodiment of the device according to the present invention.

FIG. 8 illustrates a third preferred embodiment of the device according to the invention, for aligning rolls on a feed line.

Figure 9:
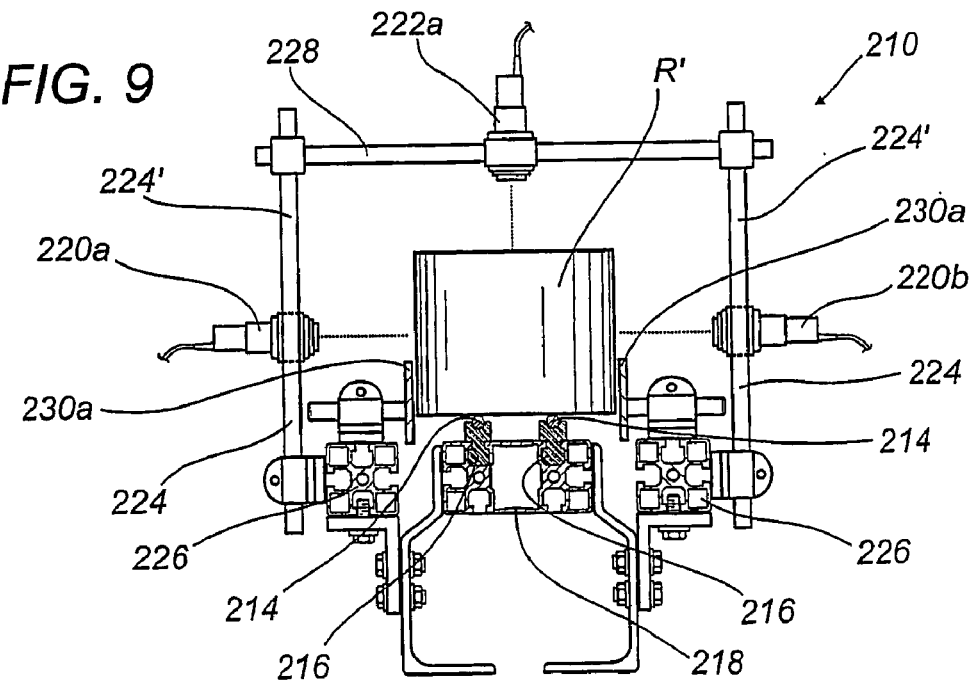
FIG. 9 is a schematic cross section of the third preferred embodiment of the device according to the present invention.

In this embodiment, the device 210 comprises a conveyor belt, which is labelled 212 in its entirety, and which, as shown also in FIG. 9, consists of a pair of belts 214, 214, with circular cross section, forming an upper section or branch 212a that supports the bottoms of the rolls and conveys the rolls in the direction of feed indicated by the arrow A in said FIG. 8.

As shown in FIG. 9, the belts 214, 214 run in longitudinal channels or grooves made in supporting elements of plastic or the like, labelled 216, which are in turn mounted on a shaped metal bar, labelled 218.

The present device for aligning rolls on a feed line is preferably used on a conveyor forming part of an installation for manufacturing the rolls and comprising at least one cutting machine used to cut the rolls of predetermined length from a longer roll or "log", and at least one wrapping machine, located downstream, used to package the rolls.

Upstream of the alignment device 210, there may be a unit for slowing down or spacing the rolls, designed to advantageously set the rolls at a predetermined distance from one another so as to allow any misaligned rolls to be easily tipped or turned to the correct feed position. This spacing unit is not illustrated in the drawings.

As shown in FIGS. 8 and 9, the device comprises suitable means for detecting the rolls that are not in the correct feed position.

These means for detecting the incorrect position of the roll as it feeds forward comprise appropriate sensors which, in this embodiment, are capable of detecting the incorrect feed position of a roll R" positioned vertically, as shown in FIG. 8, or of a roll R' positioned horizontally, as shown in FIG. 9.

As is known, the rolls normally comprise a cylindrical tube, usually made of card, around which the material, for example paper, is wound. The roll might, for example, be a roll of toilet paper, a kitchen roll or a roll of other material for household use.

In the present device, the position of the roll as it feeds forward is identified by detecting the position of the cylindrical hole through the centre of the roll, defined by the inside surface of the tube. In FIG. 10, this cylindrical hole is labelled F.

The sensors are preferably optical sensors.

In practice, there are two optical sensors 220a, 220b, illustrated in FIG. 9, mounted in such a way as to direct the light beam in a direction transversal to the feed direction.

As shown in FIG. 9, when a roll R', positioned with its axis transversal, moves past the sensors 220a, 220b, the light beam passes through the hole from one optical sensor to the other and the sensors issue a corresponding signal, which is applied to the control unit of the device to drive the means that return the roll to the correct position, as described in more detail below.

Optical means consisting of a similar pair of optical elements, or of a single optical element, are mounted in such a way as to direct a light beam in the vertical direction. FIGS. 8 and 9 show the element 222a, constituting the optical means of the sensor that detects the roll when it is vertically out of position. Although not specifically illustrated in the drawings, a second sensor element, operating in combination with the first sensor element 222a, might be mounted vertically aligned with the sensor 222a under the line of roll feed defined by the belts 214, 214, in a horizontal central position relative to the belts 214, 214 themselves.

As shown in FIGS. 8 and 9, the sensors 220a and 220b are mounted on respective vertical rods 224, supported at their bottom ends by longitudinal bars 226, which are in turn suitably connected to the aforementioned central bar 218 that mounts the belts 214, 214 forming the conveyor on which the rolls are fed. The use of the belts 214, 214 facilitates the operations of repositioning the roll to the correct position since they offer a minimal resistance to the movement of incorrectly positioned rolls.

Another pair of vertical rods 224', also supported at their bottom ends by the longitudinal bars 226, mount a crossbar 228, which is located above the conveyor belt 212 and which in turn mounts the sensors for detecting rolls that are vertically out of position.

As illustrated, the lateral metal bars 226 also support the lateral guides on which the rolls feeding forward run.

These lateral guides, which are better illustrated in. FIG. 10, constitute another advantageous feature of the present invention. Thus, to facilitate movement of the rolls that are out of position at the zone where these rolls have to be repositioned, these guides are further apart than the lateral guides 230 along the rest of the roll conveyor line.

In practice, as shown in FIG. 10, at the zone where the rolls that are out of position have to be repositioned, there are longitudinal sections 230a, 230a, which have a wider space between them than the normal sections of the lateral guides 230, 230 to which they are joined by angled connecting portions labelled 230b in FIG. 10.

Still with reference to FIG. 10, the means for returning badly positioned rolls to the correct feed position advantageously comprise means for emitting a jet of fluid, in particular compressed air, that strikes the roll to be repositioned in such a way as to move it to the required feed position on the conveyor.

The use of a jet of fluid, preferably air, has the advantage of not damaging the roll to reposition it.

Thus, the third preferred embodiment of the invention illustrated in FIG. 10, comprises a first element 232a for emitting the jet of compressed air through a corresponding nozzle 234.

A second element for emitting a jet of compressed air or similar fluid is labelled 232b in FIG. 10.

These fluid jet emitting means direct the fluid at an angle relative to the longitudinal direction L of roll feed.

More specifically, as illustrated in FIGS. 8 and 10, the emitters 232a and 232b direct the jets of air in an inclined direction that has a horizontal component making a defined angle with the longitudinal direction L (see FIG. 10) and a vertical component making an angle downwards relative to the horizontal or longitudinal direction L (see FIG. 8).

In practice, the emitters 232a, 232b are oriented in such a way that the jets of compressed air are inclined downwards relative to the feed plane 212a defined by the conveyor belt 212, as clearly shown in FIG. 8, so that the jets strike the roll at a point above the centre of gravity of the roll.

Further, the second emitter 232b acts on the side of the roll opposite that on which the first emitter 232a acts.

Also, the emitters 232a, 232b are oriented in such a way that the jets of compressed air are inclined relative to the longitudinal direction L of roll feed, as clearly shown in FIG. 10, and so that the air jets strike the roll at an off-centre position relative to the midpoint of the horizontal plane defined by the roll, causing the roll to turn in a horizontal plane.

Although it is preferable to use both a first emitter 232a and a second emitter 232b to return a roll R to a position where its longitudinal axis is aligned with the direction of feed not only in the case of rolls R" that are vertically out of position, as shown in FIG. 8, but also for rolls R' that are transversely out of position, only one of these compressed air emitters might be used.

It is understood that the first and second fluid or compressed air emitters can be mounted in a manner different from the above and that there may be more than two fluid or compressed air emitters, depending on requirements and without departing from the scope of the invention.

In short, once the sensors 220a, 220b, 222a have detected on the conveyor line a roll that is out of position transversely or vertically, at least one of the air emitters is activated to send jets of air against the incorrectly positioned roll, forcing it to tip over or turn to the correct feed position.

If the roll is incorrectly positioned with its axis set transversely to the feed direction, this incorrect position having been detected by the transverse sensors 220a, 220b, a jet of air is immediately emitted by one, or preferably both, of the emitters 232a and 232b. This air jet strikes the outside surface of the roll, causing it to turn in a horizontal plane, thanks to the fact that the jets from the emitters 232a and 232b have horizontal components that are parallel but directed in opposite directions and that both make a defined angle relative to the longitudinal direction L of roll feed as illustrated in FIG. 10.

This rotation in a horizontal plane is advantageously performed at a zone where the guides 230a, 230a are further apart so as not to hinder the rotational motion. The roll is kept in the horizontal position also thanks to the fact that, immediately downstream of the repositioning zone, the guide spacing is reduced to its previous size again. Thus, since the conveyor 212 continues to move while the air jets are emitted, the roll is channeled between the guides 230, 230 downstream of the repositioning zone, directing it, instead of transversely as previously, with its axis along the longitudinal feed direction L.

When the sensor 222a and the sensor associated to it (not illustrated) detect a roll that is incorrectly positioned vertically, either the emitter 232a or the emitter 232b may be activated. The jet of compressed air from these emitters 232a, 232b strikes the top of the roll and causes it to tip forwards or backwards, depending on whether the emitter 232a or the emitter 232b was activated. Obviously, since the conveyor preferably continues to move, it is easier for the roll to be tipped over backwards.

As shown clearly in FIG. 8, the sensors 222a for detecting the rolls that are incorrectly positioned vertically, are positioned, relative to the direction of roll feed, upstream of the sensors 220a, 220b for detecting the rolls that are incorrectly positioned transversely. Further, these sensors are positioned longitudinally between the first and second emitters 232a and 232b.

As illustrated, the fluid jet emitting means 232a and 232b are positioned at a height above the rolls on the conveyor and on the outside of the conveyor lane, so as to allow easy access by operators without interfering with the rolls moving forward along the conveyor.

In a preferred method according to the invention, if the first and second sensor means do not detect any rolls that are incorrectly positioned either vertically or transversely, no control signal or roll repositioning command is issued, whereas, if the first and second sensor means detect a roll that is incorrectly positioned vertically or transversely, a control signal is issued to activate corresponding means for repositioning the roll according to the correct longitudinal feed direction.

The fluid emitters need not be adjusted for a wide range of roll sizes, thus reducing the amount of time required by personnel for adjustments during changeovers.

FIGS. 11 and 12 illustrate a fourth preferred embodiment of the device according to the invention, for repositioning rolls on a feed line.

FIGS. 11 and 12, illustrate schematically how the sensors for detecting rolls that are incorrectly positioned transversely advantageously comprise, in addition to the aforementioned first sensor means 220a, 220b, second transverse position sensors, labelled 120b, 120a, also mounted on the vertical rods 224 at a height above the first sensor means 220a, 220b.

These second sensor means are used to identify incorrect transverse positioning on the roll conveyor of large rolls whose central hole F is too high to be detected by the first sensor means 220a, 220b.

The other parts of the device in the fourth embodiment, that is to say, those for returning incorrectly positioned rolls to the correct feed position are the same as those already described with reference to the third preferred embodiment and therefore, they are not illustrated in detail in FIGS. 11 and 12.

With the present device, which uses jets of compressed air to realign incorrectly positioned rolls, corrective action can be taken promptly, as soon as the incorrect roll position signal is issued. That means the repositioning unit occupies a very short section of the device and advantageously reduces the overall size of the device according to the invention.

It will be understood that the invention can be subject to modifications and variations without thereby departing from the scope of the inventive concept. Moreover, all the details of the invention may be substituted by technically equivalent elements.

What is claimed is:

1. An alignment device for aligning rolls, comprising:
    a feeding means (16) that feeds rolls in a longitudinal feed direction,
    the rolls (22) having an outer cylindrical surface, lateral sides and a longitudinal axis (A),
    aligned rolls being rolls positioned on the feeding means and advancing along the feeding means with the longitudinal axis longitudinally aligned with the feed direction,
    misaligned rolls being rolls positioned on the feeding means and advancing along the feeding means with the longitudinal axis non-longitudinally aligned with the feed direction; and
    a turning means (24, 26) that detects advancing vertically-positioned misaligned rolls and turns each vertically-positioned misaligned roll in a longitudinal vertical plane from a first vertical position to a second longitudinal feed position to change the misaligned roll into another aligned roll,
    each roll being turned, by the turning means, when the roll has the first position with the longitudinal axis extending vertically, to turn the roll from the first position with the longitudinal axis extending vertically to the second longitudinal feed position where the longitudinal axis extends longitudinally,
    the turning means positioned with respect to the advancing vertically-positioned misaligned rolls and including parts activated to provide a turning action by the parts engaging upper lateral surfaces of the misaligned rolls so that only the vertically-positioned misaligned rolls are turned to provide their axis longitudinally oriented with the longitudinal feed direction.

2. The device of claim 1, wherein,
the rolls are any one of paper rolls, plastic rolls for household use, aluminum foil rolls for household use, and rolls with a central hole running along the longitudinal axis and open at both ends,
the feeding means comprises a first pair of belts (16) travelling at a first speed to feed the rolls in the longitudinal feed direction at the first speed, and
the turning means comprises a sensor (Sl) that detects a presence of the misaligned rolls,
and the turning means comprises a second pair of belts (24, 26) travelling at a second speed different from the first speed,
the second pair of belts turning the vertically-positioned misaligned roll in the longitudinal vertical plane from the first vertical position to the second longitudinal feed position to change the misaligned roll into the another aligned roll by engaging an upper surface of the lateral sides so as to impart on the upper surface a speed different than the first speed causing the misaligned roll to move through 90° in the vertical longitudinal plane.

3. The device of claim 2, further comprising first and second sensors to detect whether the central hole is positioned vertically and to detect whether the central hole is positioned transversely.

4. The device of claim 3, wherein, the first and second sensors are operatively connected to the turning means to initiate the turning means to turn a misaligned roll into the second position.

5. The device of claim 1, wherein,
the turning means is positioned above the feeding means,
the turning means is positioned intermediate an upstream conveying unit (11) and a downstream conveying unit (15) downstream,
the feeding means continues to operate to move rolls while the turning means operates to move a misaligned roll from the first position to the second position.

6. The device of claim 5, further comprising:
downstream of the upstream conveying unit, a first unit (12) that spaces the rolls apart from each other at predetermined regular intervals,
the first unit comprising a conveyor belt travelling faster than the upstream conveying unit (11).

7. The device of claim 5, further comprising:
downstream of the upstream conveying unit, a first unit (12) that spaces the rolls apart from each other at predetermined regular intervals,
the first unit comprising a pair of lateral belts (12a, 12b) which belts contact the lateral sides of the rolls in such a way as to feed the rolls forward lengthways.

8. The device of claim 1, wherein,
the turning means comprises a detector that detects positioning of the rolls to initiate turning of the rolls to the second position,
the feeding means comprises a pair of endless belts, with circular cross section, fitted to corresponding guides (18) extending longitudinally,
the belts feed the rolls towards the downstream conveying unit,
with the rolls in the second position, the belts contact the rolls at two points located at equal angular intervals symmetrically about a vertical line through the center of the rolls.

9. The device of claim 1, wherein the turning means comprises a sensor that, when an adjacently positioned roll is in the first position having the longitudinal axis vertical, provides a signal that detects a vertical position of a cylindrical hole through the center of the adjacently positioned roll, the signal detecting the vertical position of the cylindrical hole indicating that the roll is in the first position.

10. The device of claim 1, wherein,
the turning means comprises a pair of first belts (24, 26) set to travel at a speed different from a speed of the feeding means,
the first belts positioned to engage an upper part of the lateral sides of the rolls when in the first position and cause the rolls to turn through 90° in the vertical longitudinal plane.

11. The device of claim 10, wherein,
the feeding means comprises a pair of endless belts extending longitudinally,
the turning means further comprises a pair of lateral second belts (28, 30) positioned at sides of the endless belts of the feeding means, the lateral second belts positioned to contact opposite sides of misaligned rolls in positions other than the first and second positions.

12. The device of claim 11, wherein each of the lateral second belts are driven at a different speed from the other lateral belt to cause combined action of the lateral second belts contacting the misaligned rolls to transversely turn the misaligned rolls by 90° in a horizontal plane to move the misaligned rolls to the second position.

13. The device of claim 12, further comprising:
positioning parts attached to the first and second belts, the positioning parts for adjusting positions of the belts.

14. The device of claim 1, wherein, the turning means acts only on rolls not in the second position.

15. An alignment device for aligning rolls, comprising:
a feeding means (16) that feed the rolls longitudinally in a first direction,
the rolls (22) having an outer cylindrical surface, lateral sides and a longitudinal axis (A); and
a turning means (28, 30) that detects advancing misaligned rolls and turns each misaligned roll in a horizontal plane from a first horizontal position to a second longitudinal, horizontal feed position, the second position being in the first direction,
each roll being turned, by the turning means, when the roll has the first position with the longitudinal axis extending horizontally and in other than the first direction, to turn the roll from the first position to the second position where the longitudinal axis extends longitudinally in the first direction,
the turning means positioned with respect to the advancing rolls and including parts activated to provide a turning action by the parts engaging the respective opposite lateral surfaces of the rolls so that only the transversely misaligned rolls are turned to provide their axis longitudinally oriented with the feed direction.

16. The device of claim 15, wherein,
the rolls are any one of paper rolls, plastic rolls for household use, aluminum foil rolls for household use, and rolls with a central hole running along the longitudinal axis and open at both ends,
the turning means comprises a sensor that detects a presence of misaligned rolls positioned with the longitudinal axis horizontal and transverse to the first direction, and
the turning means comprises a pair of lateral belts (28, 30) positioned to contact opposite sides of the misaligned rolls and turn the misaligned roll by 90° in the horizontal plane with the longitudinal axis positioned lengthways along the first direction.

17. The device of claim 16, further comprising first and second sensors to detect whether the central hole is positioned vertically and to detect whether the central hole is positioned transversely.

18. The device of claim 17, wherein, the first and second sensors are operatively connected to the turning means to initiate the turning means to turn a misaligned roll into the second position.

19. The device of claim 15, wherein,
when the longitudinal axis of any roll extends transversely to the first direction, the turning means contacts a side of the any roll to turn the any roll to the second position where the longitudinal axis extends longitudinally in the first direction.

20. The device of claim 15, wherein, the turning means acts only on rolls not in the second position.

21. An alignment device for aligning rolls, comprising:
a feeding means (16) that feeds rolls in a longitudinal feed direction,
the rolls (22) having an outer cylindrical surface, lateral sides and a longitudinal axis (A),
aligned rolls being rolls positioned on the feeding means and having the longitudinal axis longitudinally aligned with the feed direction,
misaligned rolls being rolls positioned on the feeding means and having the longitudinal axis non-longitudinally aligned with the feed direction; and a turning means (24, 26) that detects vertically-positioned misaligned rolls and turns each vertically-positioned misaligned roll in a longitudinal vertical plane from a first vertical position to a second longitudinal feed position to change the misaligned roll into another aligned roll,
each roll being turned, by the turning means, when the roll has the first position with the longitudinal axis extending vertically, to turn the roll from the first position with the longitudinal axis extending vertically to the second longitudinal feed position where the longitudinal axis extends longitudinally, wherein,
the feeding means comprises a first pair of belts (16) travelling at a first speed to feed the rolls in the longitudinal feed direction at the first speed, and
the turning means comprises a sensor (S1) that detects a presence of the misaligned rolls,
and the turning means comprises a second pair of belts (24, 26) travelling at a second speed different from the first speed,
the second pair of belts turning the vertically-positioned misaligned roll in the longitudinal vertical plane from the first vertical position to the second longitudinal feed position to change the misaligned roll into the another aligned roll by engaging an upper surface of the lateral sides so as to impart on the upper surface a speed different than the first speed causing the misaligned roll to move through 90° in the vertical longitudinal plane.

* * * * *